United States Patent [19]

Hoffmann

[11] Patent Number: 5,072,095
[45] Date of Patent: Dec. 10, 1991

[54] VESSEL WARMER UTILIZING TIMER RESET MEANS RESPONSIVE TO REMOVAL OF VESSEL

[75] Inventor: Ronald J. Hoffmann, Solon, Ohio

[73] Assignee: Mr. Coffee, Inc., Bedford Heights, Ohio

[21] Appl. No.: 620,842

[22] Filed: Nov. 29, 1990

[51] Int. Cl.⁵ .............................................. H05B 1/02
[52] U.S. Cl. .................................. 219/432; 219/492; 219/435; 219/518
[58] Field of Search ............................... 219/432–433, 219/242, 246–247, 250, 257, 259, 492–493, 435, 518, 452; 307/117, 141; 361/195–196; 99/332

[56] References Cited

U.S. PATENT DOCUMENTS

| | | | |
|---|---|---|---|
| 2,543,103 | 2/1951 | Friesen | 219/242 |
| 2,863,037 | 12/1958 | Johnstone | 219/438 |
| 3,152,245 | 10/1964 | Litman | 219/438 |
| 3,432,641 | 3/1969 | Welke | 219/521 |
| 3,488,473 | 1/1970 | Sanders | 219/438 |
| 3,636,369 | 1/1972 | Harter | 307/117 |
| 4,366,366 | 12/1982 | Ekblad | 219/242 |
| 4,418,268 | 11/1983 | Manshaw | 219/242 |
| 4,560,891 | 12/1985 | Ryczek | 307/597 |
| 4,661,685 | 4/1987 | Contri | 219/250 |
| 4,745,629 | 5/1988 | Essig et al. | 361/196 |
| 4,751,399 | 6/1988 | Koehring et al. | 307/117 |
| 4,801,782 | 1/1989 | Ineson | 219/438 |
| 4,942,046 | 7/1990 | Scott | 219/518 |

Primary Examiner—Bruce A. Reynolds
Assistant Examiner—John A. Jeffery
Attorney, Agent, or Firm—D. Peter Hochberg; Mark Kusner; Louis J. Weisz

[57] ABSTRACT

Apparatus for warming coffee or other beverage includes a warmer plate on which a vessel holding the beverage to be warmed is set, a heater for heating the warmer plate, circuitry for controlling the time the warmer plate is in a heating condition and a weight sensitive switch for enabling the circuitry only when a vessel of pre-determined weights is on the warmer plate. The circuitry further includes components for reinitializing the time the warmer plate is in a heating condition after a vessel is removed from the warmer plate under predetermined time conditions and then replaced thereon.

6 Claims, 4 Drawing Sheets

VESSEL WARMER UTILIZING TIMER RESET MEANS RESPONSIVE TO REMOVAL OF VESSEL

This invention relates to apparatus for warming liquids in vessels, and in particular to such apparatus having electronic circuitry for energizing a heater under controlled conditions. The invention more particularly relates to a warmer for keeping coffee, tea and other beverages hot, after they have been brewed, steeped or the like for controlled time periods. The invention further relates to such warmers which can only be actuated when a vessel of a pre-determined weight is held thereon.

BACKGROUND OF THE INVENTION

Warmers for heating foods have been around for sometime, and generally consist of a low wattage heater element contained in a housing and operable to be turned on or off with a manual switch of some type. Sometimes an indicator light is illuminated when the heater is turned on. Some patents which have been issued on warmers for cups include U.S. Pat. No. 4,442,343 (Genuit et al., 1984); U.S. Pat. No. 4,523,083 (Hamilton, 1984); U.S. Pat. No. Des. 259,168 (Petrie, 1981); U.S. Pat. Des. 259,168 (Petrie, 1981) and British Design Registration 1,038,833 (Motor Electric Manufacturing Co., 1987). A number of coffee brewing systems are known having hot plates for maintaining a pot of coffee warm after it has been brewed. U.S. Pat. No. 2,660,658 (Wagner, et al., 1953) discloses an electric heating unit for heating a pressure cooker, and having a weight sensitive switch for actuating the unit only when the unit having the weight of a cooking vessel is installed on the machine. Many other units for keeping warm cooking vessels and plates are well known.

However, these units, and particularly units for keeping brewed coffee warm, have some serious problems. These problems relate to using these warmers when they are left unattended or when the user forgets to turn them off. If the liquid level in the vessel for holding the liquid is low, the evaporation can vaporize the liquid, leaving behind tars, solids and chemicals which were suspended in the liquid. These residues can cause stains, deterioration and potential damage to the containing vessel. In addition, if a paper towel or other flammable material is set over the warmer, it can be damaged or even set aflame. The longer the time such a material is on the warmer unit, the worse the degradation. When a coffee warmer is left on, with no vessel to warm or with an empty vessel in place, there is caused a waste of energy and possibly damage to the vessel. As discussed below, the present invention controls the warmer for a vessel for holding such liquids as brewed coffee, with a timing system for controlling the amount of time the warmer remains on, and further for controlling the operation of the unit when a vessel on the unit is removed from the unit and then replaced thereon. The foregoing aspect of the invention keeps the liquid warm yet avoids the overheating problems which have occurred in the prior art.

SUMMARY OF THE INVENTION

It is an object of the present invention to provide an apparatus for warming liquids in a containing vessel in a manner which limits heating the vessel to a pre-determined period of time.

Still a further object of the invention is to provide a warmer for a liquid held in a vessel which is actuated when the vessel is placed on the warmer unit.

A further object of the invention is to provide apparatus for warming coffee or other beverage in a vessel, the apparatus having circuitry including a period timer circuit for shutting off the heater unit after the unit has been on for a pre-determined period of time.

Yet another aspect of the present invention is to provide a warmer unit as described above, but having reset means for initializing the period timer circuit when the vessel is removed from the warmer unit which is on, and then replaced after a pre-determined period of time.

Yet still a further aspect of the present invention is to provide an apparatus for heating the beverage such as coffee in a vessel having a timer circuit as described above, but having a reset means for initializing the period timer circuit when the vessel is removed from the warmer unit in its OFF state and then replaced after a pre-determined period of time.

A more general object of the invention is to provide an economic and efficient warming unit for liquids held in a vessel which is effective in use and economical to build and operate.

Other objects will become clear from the description to follow and from the appended claims.

The foregoing objects are achieved according to the preferred embodiment of the invention discussed below for keeping coffee in a carafe or mug warm. The apparatus has a heating means including a warmer plate for supporting the mug or carafe to be warmed, and a heater for generating heat to the warmer plate. A power supply energizes a control module having an operating circuit. A weight sensitive switch closes the circuit when a vessel is put on the warmer plate, and a power switch completes the circuit when the weight sensitive switch is closed. A timer circuit controls the operation of the power switch to energize the warmer under different conditions. The timer circuit has a period timer which is initialized for a pre-determined period of time $T_p$ to enable the power switch for time period $T_p$. The timer circuit also has one timer reset for resetting period timer for time period $T_p$ if the vessel is removed from the warmer plate for some pre-determined period of time $T_{r1}$ and then replaced on the support or if there is a brief interruption of power. Another timer reset can also be incorporated in the timer circuit, for resetting the time period $T_p$ if a vessel is taken off the warmer for a pre-determined period of time $T_{r2}$ and then replaced when the warmer is OFF; however, if the vessel is taken off the warmer and replaced in a short period of time less than $T_{r2}$, the warmer will remain in the OFF condition.

DETAILED DESCRIPTION OF THE PREFERRED EMBODIMENT OF THE INVENTION

Figure 1:
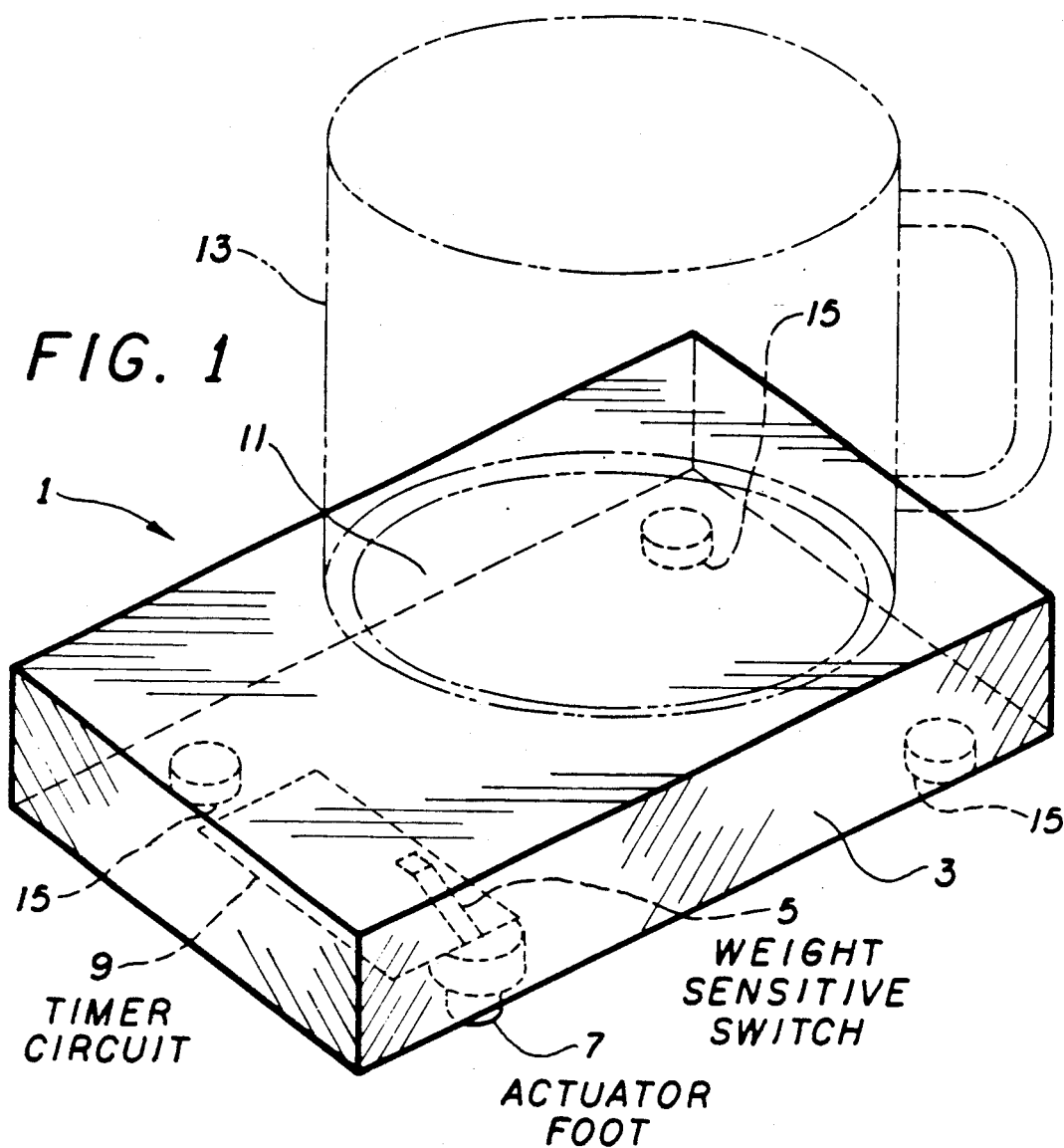
FIG. 1 is a perspective view of the preferred embodiment of the invention.
Figure 2:
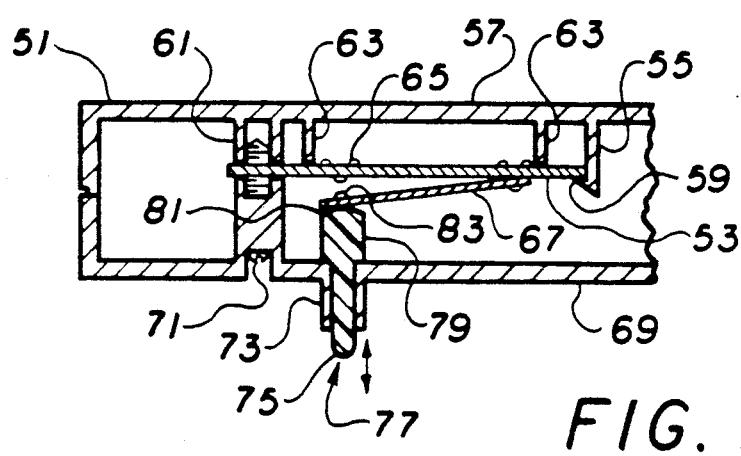
FIG. 2 is a cross-section of a warmer switch which can be used in the embodiment of FIG. 1.

FIG. 1 shows in preferred form an apparatus 1 for warming a beverage such as brewed coffee in a vessel. (The term "warming" means keeping at a desired elevated temperature a liquid which was placed on the apparatus in heated form, or for heating to the desired temperature a cool liquid.) Apparatus 1 includes a housing 3, a weight sensitive switch 5 with its actuator foot 7, a timer circuit 9 and a warmer or heater plate 11. A vessel such as a coffee carafe or mug 13 is seated on warmer plate 11. Warmer plate 11 should be chosen to accommodate the size of the vessel to be placed thereon; and a relatively small warmer plate to be used for coffee cups or mugs, whereas a larger warmer plate 11 could be used for coffee pots and carafes. A set of mounting feet 15 extend downwardly from the housing towards a resting surface on which the housing is to be set, these mounting feet being parallel with actuator foot 7. The length of actuator foot 7 must be determined with respect to the length and placement of the other support feet 15 to ensure that the weight of the liquid containing vessel 13 is applied to and operates weight sensitive switch 5 when vessel 13 is properly placed on warmer plate 11. A type of actuator foot means for use on apparatus 1 is shown in FIG. 2. This device includes a housing 51 for holding in a stationary manner a printed circuit board 53. A wall 55 extends downwardly from the top surface 57 of housing 51, and includes a barb 59 for holding an edge of printed circuit board 53. A screw 71 extends upwardly through lower housing 69 and printed circuit 53 to hold circuit 53 in place in housing 51. A pair of downwardly extending walls 63 abut printed circuit 53 to assure the proper placement of the circuit board. Circuit board 53 includes a fixed rivet contact 65 and a spring contact 67 which is riveted to circuit board 53 and extends over fixed contact 65. Housing 51 has a lower wall 69 which has a hollow cylinder 73 dimensioned to hold the foot 75 of actuator foot 77. Actuator foot 77 has an enlarged portion 79 which is unable to slide into the aperture of cylinder 73, in which foot 75 is in sliding engagement. Enlarged portion 79 has rounded portion 81 for engaging spring contact 67. When the actuator foot means forms a part of apparatus 1, and the apparatus is set on a resting surface, foot 77 helps to support the unit. When a weight of sufficient strength is set on the housing, such as a vessel in warmer plate 11, foot 77 and enlarged portion 79 move upwardly until spring contact 77 engages rivet contact 65.

Figure 3:
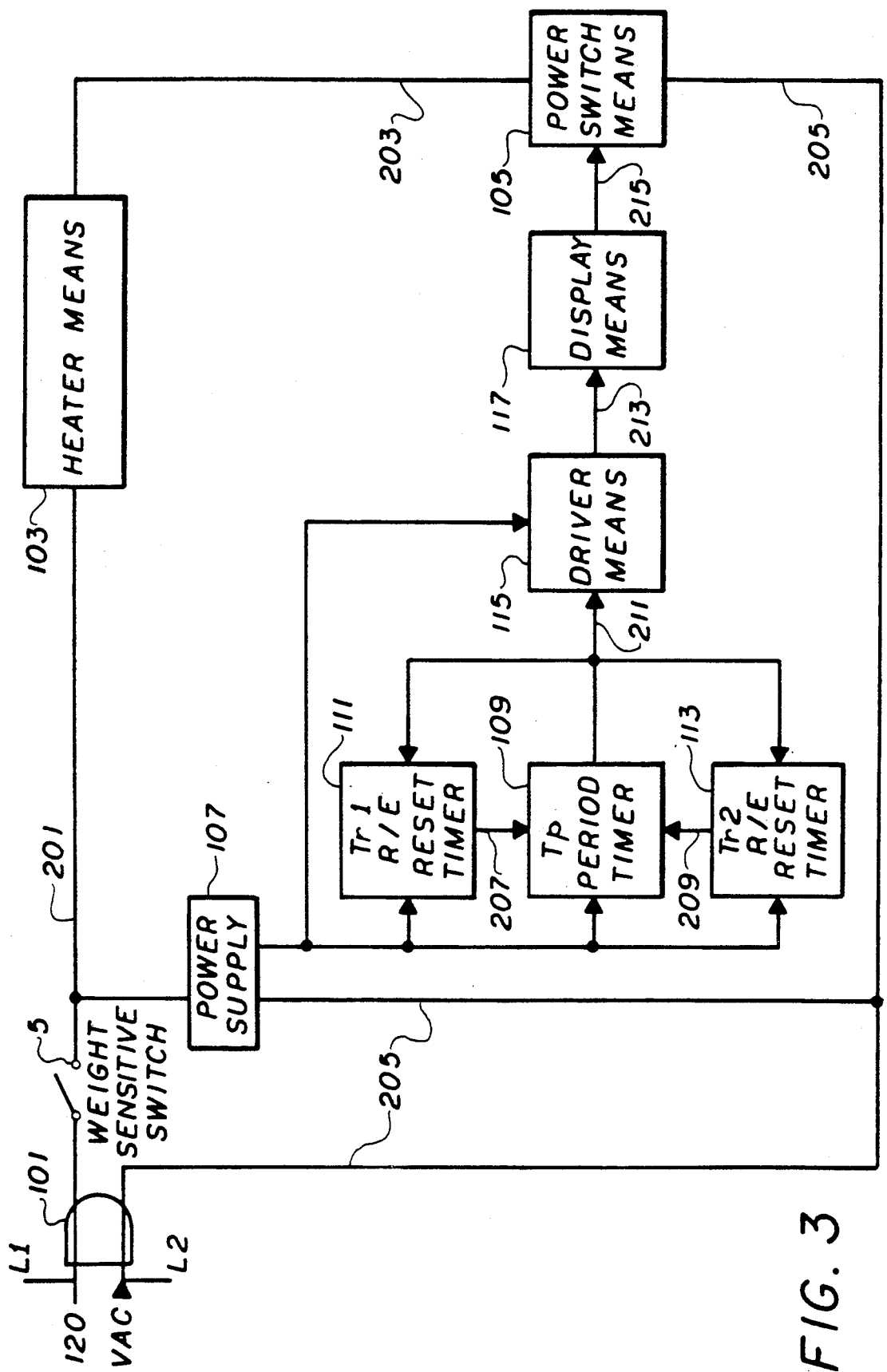
FIG. 3 is a block diagram of the electronic circuit for use with the preferred embodiment of the invention.

A schematic of the timing circuitry is shown in FIG. 3. A hot line L1 and a neutral line L2 extend through a plug 101. The weight sensitive switch 5 is in a connector 201 going to a heater means 103, which can advantageously be a rope heater, a metallic film heater, a conductive ceramic heater or other types of heaters generally known in the art. The output of heater means 103 is a connector 203 which goes to a power switch means 105, this power switch means can preferably be an electro-mechanical device like a relay, or an electronic device such as a triac or thyristor. The output of power switch means 105 is a conductor 205 which proceeds to a power supply 107. The power supply provides voltage and current to the control circuits including a period timer Tp 109, which limits and controls the time period when the heating means automatically turns off; reset timers Tr1 111 and Tr2 113 for resetting period timer Tp 109 as explained below, which are connected to period timer 109 by connectors 207 and 209, respectively; driver means 113, connected to period timer 109 by connector 211, for controlling the ON state of a display means 117 via connector 213 and of power switch means 105 to which it is connected by connector 215. When a liquid carrying vessel 13 is disposed on warmer plate 11 to depress actuator foot 7 and close weight sensitive switch 5, the latter switch is closed, and power supply 107 supplies power to the remainder of control module composed of the components shown in FIG. 3 relating to the energization of heater means 103. Upon the closing of weight sensitive switch 5 after a vessel of the proper weight is placed on warmer plate 11, timer Tp 109, and reset timers Tr1 111 and Tr2 113, are reset; therefore setting timer Tp 109 to its state A, ON. When timer Tp is in state A, ON, driver means 115 is turned ON from its signal received on connector 211, and it in turn emits a signal over connector 213 to turn display means 117 ON, which in turn, through connector 215, turns power switch means 105 ON. When power switch means 105 goes to its ON state, the circuit from L1 is completed through weight sensitive switch 5, and power through connector 201 turns heater means 103 ON. The circuit through connector 203, connects power switch means 105 and connector 205 to the L2 neutral line. The heater means 103 becomes warm to heat the liquid such as coffee in vessel 13.

If a vessel with the beverage is placed on warmer plate 11 and the power is not discontinued for any reason, period timer Tp 109 keeps power switch 105 closed and heater 103 remains on for the full period set by period timer Tp, such as 30 minutes. If the liquid containing vessel 13 is lifted from the warmer plate while period timer Tp 109 is in its state A, ON, then weight sensitive switch 5 opens, and reset timer Tr1 begins timing. If the liquid containing vessel is replaced on the warmer plate, switch 5 closes. If reset timer Tr1 111 is timed out (which could be one second, for example) then the heater means 103 remains in its state A, ON, and timer Tp 109 is reset, and begins counting for its full auto-shut-off timer period Tp; as indicated above, this could be 30 minutes. On the other hand, if reset timer Tr1 111 is not timed out, then period timer Tp 109 is not reset and heater means 103 stays in its ON state A; period timer Tp 109 continues timing for the duration of its predetermined time Tp.

If a liquid containing vessel is on plate A for the pre-determined time period of period timer Tp 109, i.e., 30 minutes, timer Tp 109 times out, and enters its state B, OFF; this turns driver means 115 OFF, display means 117 OFF and power switch means 105 OFF. Reset timer Tr1 111 is disabled, and reset timer Tr2 113 is enabled. If the liquid containing vessel is removed from the warmer plate, reset timer Tr2 113 begins to time out. If the liquid containing vessel is placed back on the warmer plate before reset timer Tr2 113 has timed out, then period timer Tp 109 is not reset and heater means 103 stays in its state B, OFF, and reset timer Tr2 113 is reset. On the other hand, if the liquid containing vessel is placed on the warmer plate after reset timer Tr2 113 has timed out, then period timer Tp 109 is reset, to put the apparatus in its state A, ON. Where it enters its state A, ON, reset timer Tr2 113 is disabled, reset timer Tr1 109 is enabled, timer Tp 109 actuates driver means 115, display means 117 and power switch means 105 to begin a new ON time period Tp. If the time period for reset timer Tr1 111 is relatively short, for example, one second, and a longer time period, for example 10 seconds, is established for reset timer Tr2 113, period or auto-shut-off timer Tp 109 will be reset quickly when the unit is in its state A, ON, but will reset slowly if it is in its state B, OFF condition. Thus, brief power interruptions of the line voltage will not restart the warmer unit if it is in state B, OFF.

Figure 4:
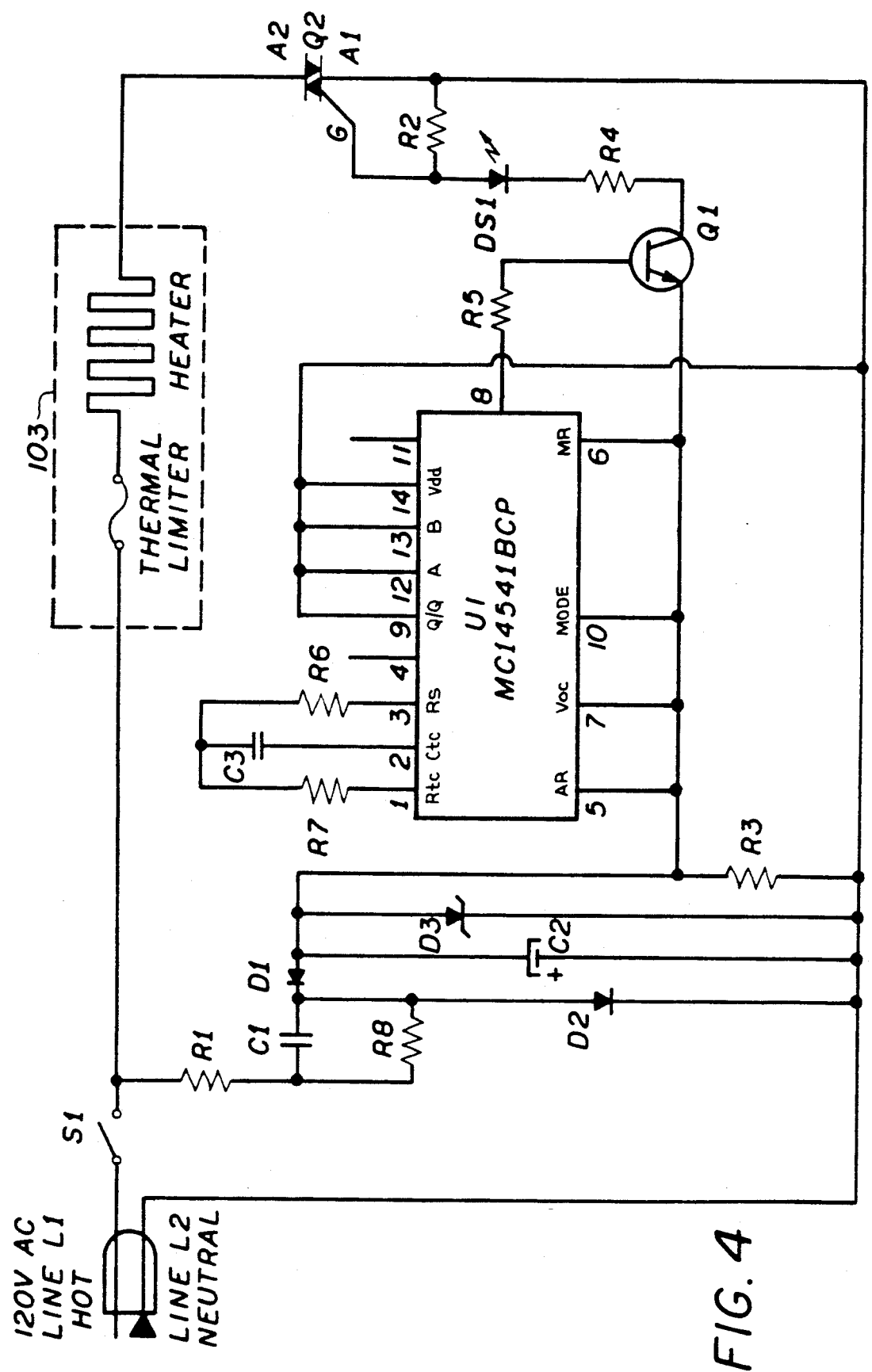
FIG. 4 is a schematic diagram of the details of the circuitry for the embodiment of FIG. 1.

FIG. 4 is a schematic diagram showing circuitry in detail for that shown in FIG. 3. When the weight sensitive switch, hereafter called S1 is activated, power is supplied to heater means 103, and the power supply means 107. The power supply means is composed of capacitors C1 and C2, diodes D1, D2 and D3, and resistors R1, R3 and R8. Resistor R1 limits the initial surge current and additionally acts as a fusible link in the event of a short circuit of capacitor C1. Resistor R8 serves to discharge C1 if weight sensitive switch S1 is opened during a peak line voltage. Capacitor C1 and diodes D1 and D2 form a half wave charge pump with respect to line L2(neutral). When line L1 is positive with respect to line L2, then excess charge on capacitor C1 is pumped through diode D2 to line L2. When line L1 goes negative with respect to line L2, then diode D2 is reverse biased and charge is drawn through diode D1 which creates negative voltage charge across capacitor C2. Zener diode D3 limits the voltage across capacitor C2 to 15 volts to operate the timer Tp 109, the driver means 115, the ON display means 117, and the power switch means 105. Resistor R3 is selected to discharge capacitor C2 to form timer Tr2 113, so that the timer Tp 109, which has timed out and is in the OFF condition, will be restarted after a specific interval, e.g., 10 seconds, when weight sensitive switch S1 is opened. The time interval to restart the timer Tp 109 can be varied by selecting different values for capacitor C2 and resistor R3. Increasing either value will increase the time interval, Tr2 and decreasing either value will decrease the time interval Tr2. When the timer Tp 109 is in the ON state, the driver means 115 and the ON indicator or display means 117 are then turned ON. The current used by the driver means 115 and the ON indicator means 117, quickly discharge capacitor C2 and restart the timer Tp 109, after a brief opening of switch S1. Thus, when the warmer unit is heating the liquid containing vessel 13, a brief opening and reclosing of switch S1 will reset and restart the timer Tp 109, and restart the auto-shut-off timer period Tp. When the warmer unit is OFF and is not heating liquid containing vessel 13, weight sensitive switch S1 must be opened for a much longer period of time, Tr2, and is dependent on the value of capacitor C2 and resistor R3. This prevents brief power line glitches and interruptions from restarting the warmer unit when it is OFF.

The timer Tp 109 is comprised of resistor R6 and R7, capacitor C3 and integrated circuit U1. The clock oscillator timing components, capacitor C3 and resistors R6 and R7, set the clock frequency for IC, U1. Integrated circuit U1 divides the clock frequency into the auto-shut-off time period Tp, depending on the connection of the divider select pins. In this embodiment, a divide ratio of 65,536 was chosen to reduce the values of the clock oscillator timing components. The automatic reset and the master reset functions of IC and U1 are selected OFF so that only the internal power-up-reset function can restart the timing period after the Vdd to Vss chip voltage has fallen below a preset internal reference level. The mode select pin is connected to ground so that the output Q will remain high during the time period, Tp and then go low when the time period Tp has ended.

The driver means 115 is composed of resistors R4 and R5 and transistor Q1. During the timing (warming period), Tp, the timer circuit output Q is high. This turns on transistor Q1 through resistor R5. The emitter of transistor Q1 is connected to the minus side of capacitor C2 which is always a negative 15 volts with respect to line L2. Therefore, when transistor Q1 is turned ON, it draws current through resistor R4, LED, DS1 and the gate of triac Q2. Resistor R4 limits the current drawn through LED, DS1 and the gate of triac Q2. When current is drawn from the gate of triac Q2, the triac conducts continuously from terminal A1 to terminal A2 and supplies voltage and current to the heater means 103. When current is drawn through LED, DS1, the LED is ON and indicates power is being applied to the heater means 103. When transistor Q1 is turned OFF at the end of the timing period Tp, LED, DS1, triac Q2 and heater means 103 are turned OFF. Resistor R2 ensures that the gate of triac Q2 is held to line L2 so that it is not triggered when transistors Q1 is OFF. The timer Tp 109 cannot be restarted until switch S1 is opened and the voltage across capacitor C2 has discharged through resistor R3 below the internal reference value of IC, U1. If transistor Q1 is ON, the LED/triac driver current will quickly discharge capacitor C2 below the internal reference value and restart the time period Tp, after switch S1 is closed.

The circuit topology minimizes the number of components required to perform the timing-lockout strategy and accomplish the ON/OFF reset timing difference by over-lapping and combining the function of the circuit components, e.g., the indicator LED, DS1 as part of the triac Q2 and driver transistor Q1 circuit, the triac/display/driver circuit is part of timer Tr1. Combining this with the weight sensitive foot switch S1, offers an easy to use, user responsive, automatically actuated, auto-shut-off which can be produced at low cost.

LOGIC DIAGRAM DESCRIPTION

Figure 5:
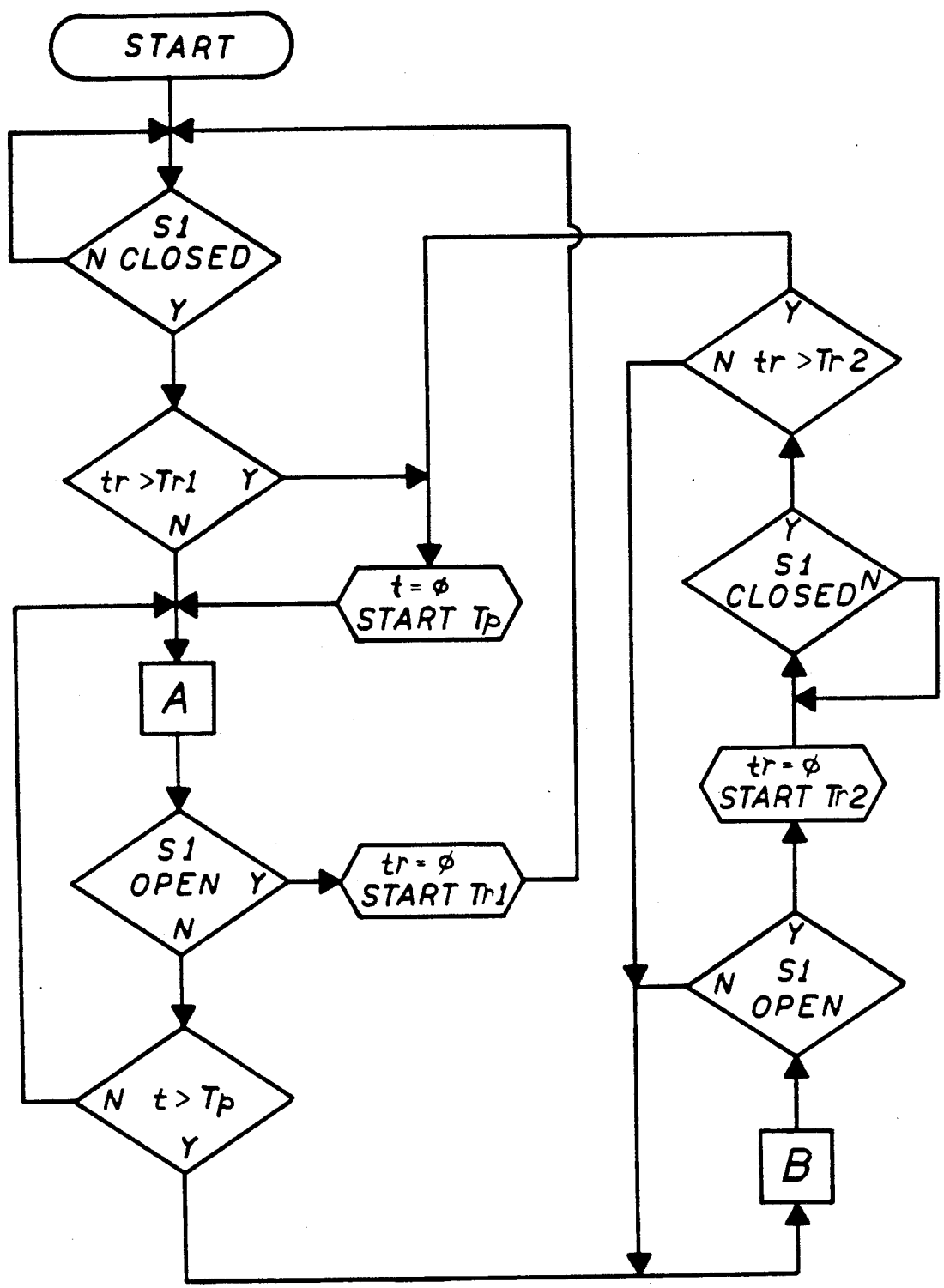
FIG. 5 is a flow diagram for the operating circuit of the embodiment shown in FIG. 1.

FIG. 5 shows the logic flow diagram indicating the various states and conditional changes of the invention controlled by the logic equations. The following is a list of abbreviations and definitions for the FIG. 5 logic flow diagram:

A—ON state, t<Tp, S1 is closed
B—timed OFF state (t>Tp), S1 is closed
Tp—reference auto-shut-off time period
Tr1—reset reference time after A, ON state
Tr2—reset reference time after B, timed OFF state
tr—time after S1 has opened
t—time after S1 has closed Referring to FIG. 5, when the user places the liquid containing vessel 13 on the warmer plate 11, switch S1 closes. If switch S1 has been open for longer than time Tr1, then let t=0 and go to state A(ON, S1 closed, t increasing). The state A loop compares time "t" to "Tp"; if t>Tp, then go to the state B(OFF, S1 closed). If S1=open, then let tr=0, check if S1=closed. When S1=closed, then compare tr with Tr1. If tr>Tr1, then let t=0 and go to state A(ON, S1 closed, t increasing). If tr<Tr1, then go to state A (ON, S1 closed, t is not reset). When the warmer unit is in state B, OFF, the test loop checks to see if S1 is open. If S1=open, start Tr2 timing, let tr=0, and check if S1=closed. When S1=closed, then compare tr with Tr2. If tr<Tr2, then go to state B (OFF, S1 closed). If tr>Tr2, then let t=0, start Tp timing and go to state A (ON, S1 closed, t increasing). By making Tr1 small, e.g., one second, and Tr2 large, e.g., ten seconds, when the user picks up the liquid containing vessel and the warmer unit is ON, the timer circuit is reset almost immediately and when the liquid containing vessel is replaced on the warmer unit, a new auto-shut-off time period will begin. When the user picks up the liquid containing vessel and the warmer unit is OFF, the timer circuit will not be reset for ten seconds after S1 is open. Thus, brief power line interruptions will not restart the warmer unit which adds safety and conservation to the list of features this auto-shut-off provides.

The invention has been described above with particular emphasis on the preferred embodiment, but variations and modifications within the spirit and scope of the invention may occur to those skilled in the art to which the invention occurred from the description above and from the appended claims.

What is claimed is:

1. Electrically powered apparatus for warming a beverage in a vessel, said apparatus comprising:
    weight-sensitive switch means for terminating electrical power to said apparatus when a vessel of at least some predetermined weight is removed from said apparatus;
    electrical heater means for holding a vessel and for generating heat to said vessel in response to electric power supplied to said heater means;
    power switching means actuable for supplying electric power to said heater means; and
    timer means for actuating said power switching means, said timer means including:
        period timer means responsive to the actuation of said weight-sensitive switch means to actuate said power switching means for pre-determined time period Tp, the supply of electric power to said heater means being terminated after a time period Tp, and said supply of electrical power being reinitialized to said time period Tp when the vessel is removed from the heater means for predetermined time period(s) and replaced thereon.

2. Apparatus according to claim 1 wherein said timer means further includes reset timer means for timing the period of time the vessel is removed from said heater means during said time period Tp, said reset timer means reinitializing said period timer means for said time period Tp if said removal time period is greater than a pre-determined time period Tr1.

3. Apparatus according to claim 1 wherein said timer means further includes second reset timer means for timing the period of time the vessel is removed from said heater means after said pre-determined time period Tp, said second reset timer means reinitializing said period timer means for said time period Tp if said removal time period is greater than a pre-determined time period Tr2.

4. Apparatus according to claim 1 wherein said timer means further includes:
    first reset timer means for timing the period of time the vessel is removed from said heater means during said timer period Tp, said first reset timer means reinitializing said period timer means for said timer period Tp if said removal time period is greater than a pre-determined time period Tr1; and
    second reset timer means for timing the period of time the vessel is removed from said heater means after said pre-determined time period Tp, said second reset timer means reinitializing said period timer means for said time period Tp if said removal time period is greater than a pre-determined time period Tr2; and
    wherein said apparatus further includes weight sensitive switch means operatively connected to said period timer means, said first reset timer means and said second reset timer means, for initializing each of said timer means when a vessel of at least some predetermined weight is placed on said heater means.

5. Apparatus according to claim 1 wherein at least part of said timer means is on a printed circuit board, said circuit board having a stationary contact and a spring contact affixed to said circuit board and being movable to engage said stationary contact; for holding said circuit board in a stationary position and actuator foot means disposed between a surface on which said apparatus is to be rested and said spring contact, said actuator foot means moving said spring contact into engagement with said stationary contact when a predetermined weight is placed on said housing means.

6. Apparatus according to claim 1 and further including drive means connected to said timer means for activating said power switch means, and display means connected to said driver means for indicating when electric power is being supplied to said heater means, said driver means activating said display means when said driver means activates said power switching means.

* * * * *